Aug. 25, 1953 R. O. WOYCHIK 2,650,048
AIRPLANE LANDING GEAR
Filed Jan. 31, 1950 3 Sheets-Sheet 1
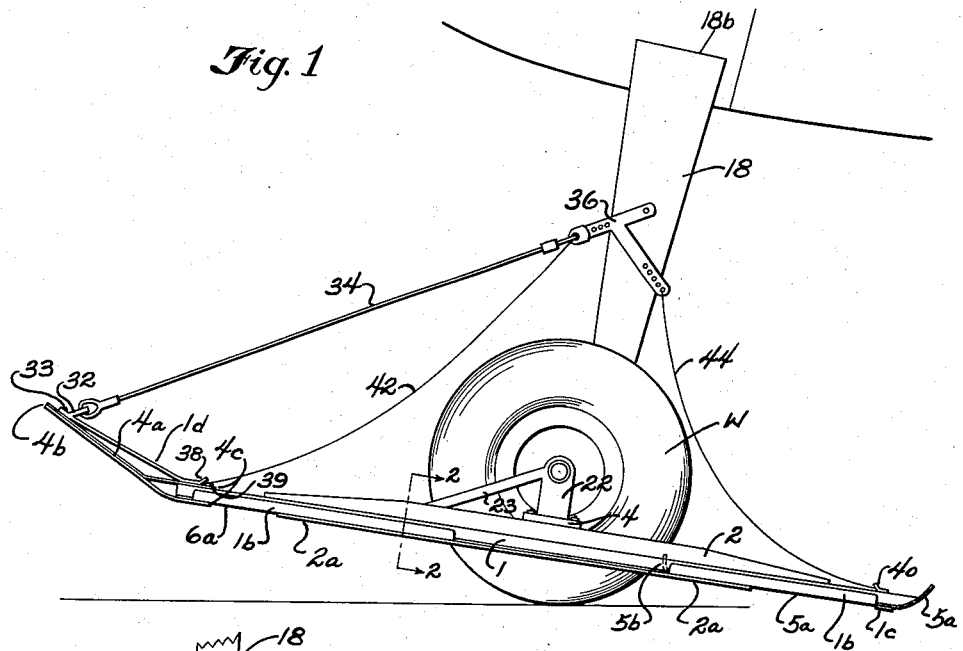
INVENTOR
RAYMOND O. WOYCHIK
BY Joseph G. Werner
ATTORNEY Aug. 25, 1953 — R. O. WOYCHIK — 2,650,048
AIRPLANE LANDING GEAR
Filed Jan. 31, 1950 — 3 Sheets-Sheet 2

INVENTOR
RAYMOND O. WOYCHIK
BY Joseph G. Werner
ATTORNEY

Aug. 25, 1953 R. O. WOYCHIK 2,650,048
AIRPLANE LANDING GEAR
Filed Jan. 31, 1950 3 Sheets-Sheet 3
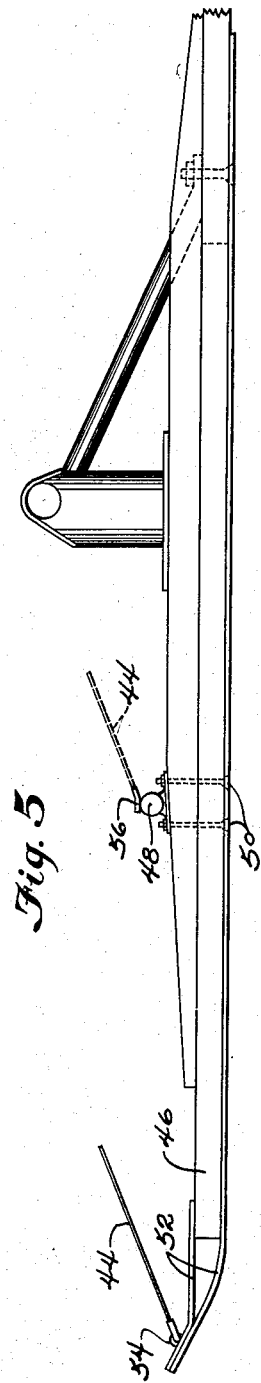
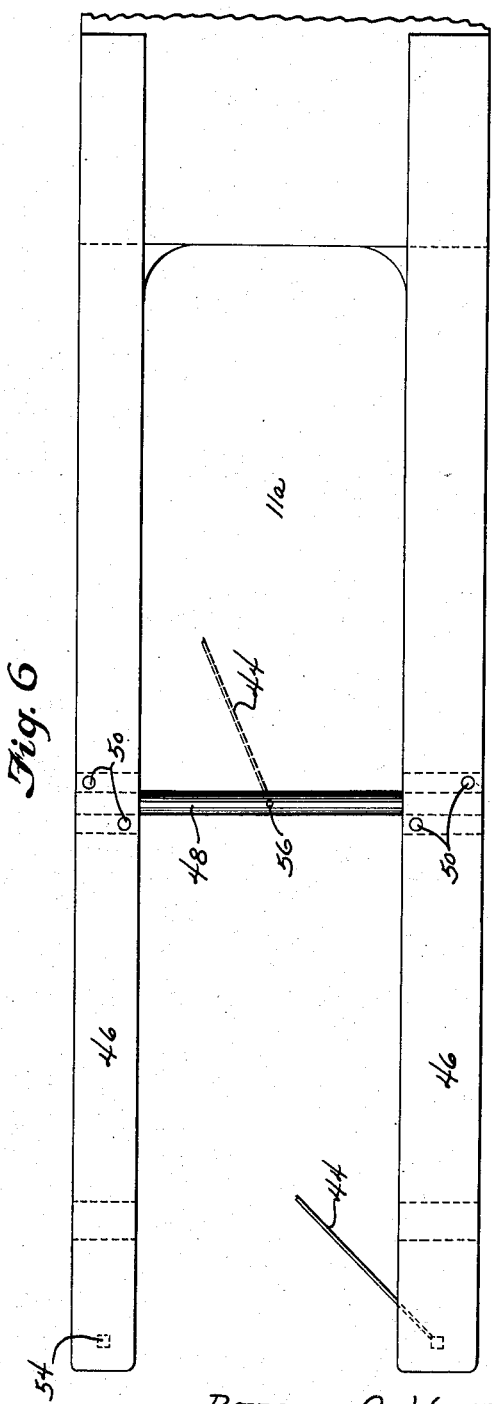
INVENTOR
RAYMOND O. WOYCHIK
BY
ATTORNEY Patented Aug. 25, 1953

2,650,048

UNITED STATES PATENT OFFICE 2,650,048

AIRPLANE LANDING GEAR

Raymond O. Woychik, Middleton, Wis.

Application January 31, 1950, Serial No. 141,458

4 Claims. (Cl. 244—108)

1

This invention relates to improvements in airplane landing gears and particularly to combination wheel-ski landing gears for airplanes.

It is an object of the invention to provide a combination wheel-ski landing gear for airplanes which may be used either on land or snow or on any combination of both land and snow or slush, which may remain attached to the airplane throughout the winter season regardless of changes in weather conditions or the amount of snow on airplane landing fields.

It is a further object of the invention to provide a combination wheel-ski landing gear for some types of airplanes which is light in weight and may be easily and economically attached to the airplane without substantial modification of the structure of the airplane.

Another object of the invention is to provide a combination wheel-ski landing gear for use on airplanes in climates subject to snow and freezing conditions by providing greater safety in landing and taking off and permitting complete control of the airplane with full use of the brakes and with less danger of nosing over where the landing field is rough or has alternate snowy and bare areas.

An additional object of the invention is to provide a combination wheel-ski landing gear for airplanes which will prevent snow from accumulating or packing on the top of the ski, and to give the benefits of the cushion or shock-absorbing qualities of the airplane tires on packed snow or ice.

Another object of the invention is to provide a combination wheel-ski landing gear for airplanes which permits the airplane to be backed into parking position in the hangar or elsewhere while the device is attached.

A further object of the invention is to provide a combination wheel-ski landing gear for airplanes which can be manufactured economically so that owners of small or private airplanes will be able to purchase and attach them to their airplanes.

Other objects and advantages will be apparent from the following detailed description taken in conjunction with the accompanying drawings while a preferred embodiment of the principles of the invention has been selected for exemplification.

In the drawings:

Fig. 1 is a side elevational view of a ski constructed in accordance with the present invention and shown attached to standard airplane landing gear;

2

Fig. 2 is a vertical sectional view forwardly of the pedestals, taken on the line 2—2 of Fig. 1 and looking in the direction of the arrows;

Fig. 5 is a side elevational view of the rear end portion of a modified form of ski, the forward portion being similar to that shown in Figs. 1–4;

Fig. 6 is a bottom plan view of Fig. 5; and

Figure 3:
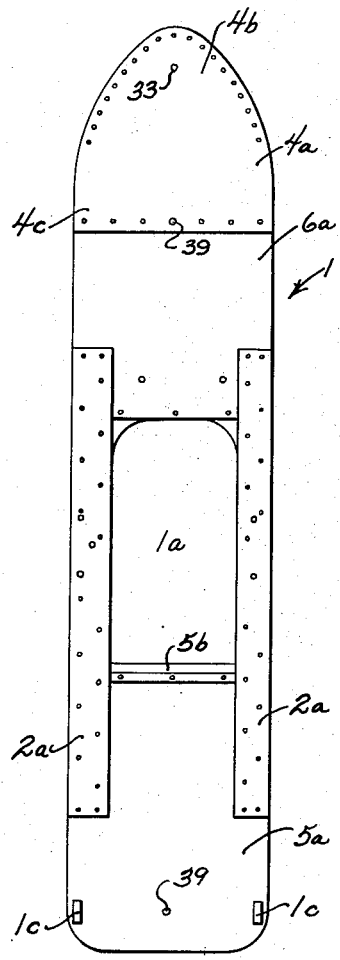
Fig. 3 is a bottom plan view of the ski.
Figure 4:
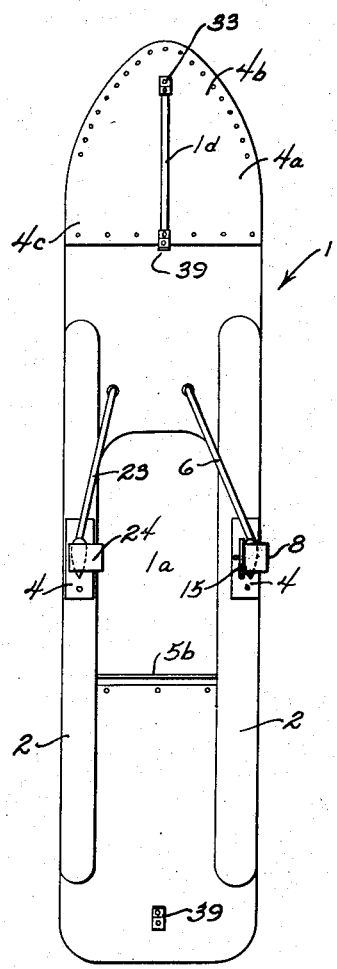
Fig. 4 is a top plan view of the ski.
Figure 7:
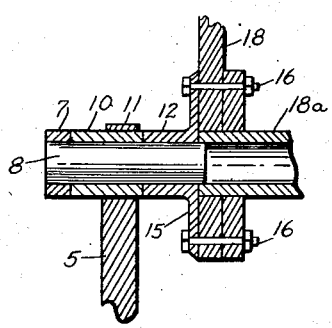
Fig. 7 is a vertical sectional view of a portion of an inside pedestal and axle.

Referring more particularly to the drawings wherein like numerals refer to like parts, a ski is indicated at 1 with an opening 1a of sufficient size to accommodate the lower portion of the airplane wheel W. Covering the bottom of the flat portion of ski 1, except for opening 1a, is sheathing 5a extending rearward from opening 1a and sheathing 6a extending forward from opening 1a to the point where the toe of the ski turns upward, which sheathing may be attached to the bottom of the ski by screws or other suitable means. Sheathing 5a and 6a is formed to extend over the sides of ski 1 as lips 1b. The forward end of sheathing 5a is extended upward to form flange 5b close to but not contacting the airplane wheel preventing accumulation of snow on the upper side of the rear ski. Flange 5b may be either an extension of sheathing 5a or it may be attached separately by screws, bolts or other suitable means. The rearward extremity of sheathing 5a is extended upward to permit the airplane to be backed up while the device is attached. Extending on longitudinal sides of the bottom of ski 1 and on either side of opening 1a elongated runners 2a, comprising strips of metal or other suitable material is attached by screws or other suitable means. Hardened steel wear tabs 1c or other suitable material may be attached to sheathing 5a at the rear of the ski to decrease the wear on sheathing 5a when the aircraft is landed on hard surfaces.

The forward end of the ski consists of upturned plates 4a joined at their toe ends 4b by rivets or other means and spaced at their rear ends 4c to receive the forward flat portion of ski 1, which may be attached by screws or bolts.

On the top side of ski 1 rails 2 are secured on opposite longitudinal sides of the ski to which metal plates 4 are secured by bolts or other means to rails 2 and ski 1, forming the base for upright posts 5 and 22. The inside post 5 carries sleeve 10 for stub axle 8. Plate 15 carrying tube 12 is attached to landing gear spring 18 and landing gear axle 18a by bolts 16. Stub axle 8 fits into tube 12, which is secured to plate 15 by welding or other suitable means. Plates 13 are welded on opposite sides of tube 12 and to plate 15 for reinforcement of tube 12 and to reinforce the attachment of tube 12 with plate 15. Collar 7 is secured to stub axle 8 by bolt 9 and stub axle 8 is attached to tube 12 by bolt 14.

Outside post 22 carries sleeve 26 for stub axle 27 which is inserted within landing gear axle 18a and secured thereto by bolts 29. Collars 24 are secured to stub axle 27 by bolts 28. The outer end of stub axle 27 is extended beyond collar 24 and is provided with holes 30 to permit the insertion of a bolt or punch to serve as a handle in facilitating the removal of stub axle 27 from landing gear 18a. Extending from posts 5 and 22 to the top of ski 1 are braces 6 and 23 which are secured to the ski by bolts or other means. Shoulders 11 and 25 extend around sleeves 10 and 26 and are welded to the sleeves and the upper ends of braces 6 and 23.

Standard attachment 32 is secured by bolts 33 at the toe of the ski for the shock cord 34, the opposite end of which is secured to anchor 36 and standard attachments 38 and 40 for cables 42 and 44, respectively, are secured to the forward and rearward ends of the flat portion of ski 1 by bolts 39, the opposite ends of the cables being attached at anchor 36. Anchor 36 is secured to the landing gear strut 18. Connected between bolt 33 at the toe of the ski and bolt 39, where the front cable is attached, is extended rod 1d which gives additional support to the upturned toe of ski.

In a modified form opening 11a is extended to the rear extremity of ski 1 rearward of wheel W to form two separate runners 46, as shown in Fig. 6. Support member 48 extends across the opening 11a and is attached to each runner 46 by bolts 50. The rearward end of each runner 46 consists of upturned plates 52 joined at their rearward ends and spaced at their forward ends to receive the flat portion of runner 46. The rear cable 44 may be attached either to the rearward end of one of the runners by attachment 54, or to support member 48 by attachment 56, as shown by the broken line in Figures 5 and 6.

As shown, all forms of the invention preferably provide for inside runners of a greater width than the outside runners whereby more equally to effect support for the weight of the plane and to afford more efficient use and operation of the ski. As best shown in Fig. 2, the ski is adapted to be supported at a slight angle to the axis of the landing wheel due to the differences in lengths of members 5 and 22, which instead of being disposed in a vertical plane usually toes slightly inwardly. Thus, upon landing of the plane due to the hinged connection 18b between the landing strut and the aircraft frame the landing gear is forced relatively upwardly spreading apart the lower peripheries of the wheels and causing the inside or wide ski runner initially to engage the ground or at least to absorb a greater proportion of the weight than the outside runner. The skis of applicant's construction, therefore, provide greater strength and durability than comparable skis of symmetrical design.

In attaching the device to the landing gear spring 18 and axle 18a of an airplane, the wheel W of the plane is set into opening 1a or 11a. Outside stub axle 27 is lifted and inserted into landing gear axle 18a which is attached to the stub axle by bolts 29. Bolt 28 is inserted through collar 24 and stub axle 27 and secured. Stub axle 8, being extended through collar 10, is inserted into tube 12 and is secured thereto by bolt 14.

The advantages of the present construction over prior known landing skis for wheeled aircraft will be most apparent in its operation. As noted above aircraft having flexible landing struts or landing gear devised to spread apart on contact with the ground in landing have their axles cambered so that their wheels toe inwardly at their lower extremities; this angle is more pronounced when the aircraft is airborne. When ordinary skis are attached to these axles, the outboard edges of the skis make the primary contact on landing. This is a very narrow surface and the strain, unequally distributed is very great. The present construction, by having longer inboard posts than the outboard posts connecting the skis to the axles, offers a far wider area of ski to contact the ground on landing. This increases the stability of the aircraft at a crucial time and the force of the landing is more evenly distributed. In addition by increasing the width of the inboard portion of the skis and their cooperating runners the skis are strengthened at their points of greatest stress. The present ski, therefore, is a great improvement over the ordinary ski, offering far more safety through the increased stability of aircraft on landing on snow.

It is understood that the present invention is not confined to the precise constructions herein illustrated and described but includes such modified forms thereof as are embraced within the scope of the following claims.

What I claim is:

1. A landing ski for wheeled aircraft comprising a ski body apertured and adapted to receive an aircraft landing wheel, an outboard tubular metal post and an inboard metal post, each of said posts respectively disposed intermediate the ends of said ski, said inboard post of greater length than said outboard post, and tubular means carried by the upper ends of said posts adapted for coaxial engagement with opposite ends of the landing wheel axle to secure said ski to the aircraft, providing a greater area of contact between the ski and the ground on the landing of aircraft.

2. A landing ski for wheeled aircraft comprising a ski body apertured and adapted to receive an aircraft landing wheel, longitudinal rails disposed along the upper sides of said ski body, an outboard tubular metal post and an inboard tubular metal post, each of said posts respectively attached intermediate the ends of said rails, said inboard post of greater length than said outboard post, tubular means carried by the upper ends of said posts adapted for coaxial engagement with opposite ends of the landing wheel axle to secure said ski to the aircraft, and elongated runners attached beneath and at opposed longitudinal sides of the under surface of said ski body, providing a greater area of contact between the ski and the ground on the landing of aircraft.

3. A landing ski for wheeled aircraft comprising a ski body aperture and adapted to receive an aircraft landing wheel, longitudinal rails disposed along the upper sides of said ski body, an outboard tubular metal post and an inboard tubular metal post, each of said posts respectively attached intermediate the ends of said rails, said inboard post of greater length than said outboard post, tubular means carried by the upper ends of said posts adapted for coaxial engagement with opposite ends of the landing wheel axle to secure said ski to the aircraft, and projecting wear tabs of hardened metal on the under surface of the rearward portion of said ski body, said tabs being positioned to make the primary contact with the ground on landing the aircraft.

4. A landing ski for wheeled aircraft comprising a ski body apertured and adapted to receive an aircraft landing wheel, an upwardly extending flange on the leading edge of the rearward portion of said ski body adjacent the apertured area, longitudinal rails disposed along the upper sides of said ski body, an outboard tubular metal post and an inboard tubular metal post, each of said posts respectively attached intermediate the ends of said rails, said inboard post of greater length than said outboard post, tubular means carried by the upper ends of said posts adapted for coaxial engagement with opposite ends of the landing wheel axle to secure said ski to the aircraft, and elongated inboard and outboard runners, substantially parallel to each other, attached beneath said ski body, the inboard runner being of a relatively greater width than the outside runner.

RAYMOND O. WOYCHIK.

References Cited in the file of this patent

UNITED STATES PATENTS

| Number | Name | Date |
| --- | --- | --- |
| 1,061,198 | Nordstrom | May 6, 1913 |
| 1,220,494 | Butler | Mar. 27, 1917 |
| 1,701,212 | Nickerson | Feb. 5, 1929 |
| 1,745,126 | Stalb | Jan. 28, 1930 |
| 1,784,274 | Cotton | Dec. 9, 1930 |
| 1,844,295 | Perry | Feb. 9, 1932 |
| 1,893,647 | Kammer | Jan. 10, 1933 |
| 2,532,610 | Ditter | Dec. 5, 1950 |

FOREIGN PATENTS

| Number | Country | Date |
| --- | --- | --- |
| 71,226 | Sweden | Feb. 24, 1931 |
| 408,570 | France | Nov. 27, 1910 |